(12) United States Patent
Pfetzer et al.

(10) Patent No.: US 8,979,066 B2
(45) Date of Patent: Mar. 17, 2015

(54) SOLENOID VALVE (71) Applicant: Robert Bosch GmbH, Stuttgart (DE)

(72) Inventors: Johannes Pfetzer, Buehl (DE); Katharina Droll, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 13/649,340

(22) Filed: Oct. 11, 2012

(65) Prior Publication Data

US 2013/0099145 A1   Apr. 25, 2013

(30) Foreign Application Priority Data

Oct. 19, 2011 (DE) .......................... 10 2011 084 769

(51) Int. Cl.
F16K 31/02 (2006.01)
F16K 27/02 (2006.01)
B29C 45/16 (2006.01)
F16K 31/06 (2006.01)
B29L 31/00 (2006.01)

(52) U.S. Cl.
CPC .......... F16K 27/029 (2013.01); B29C 45/1676 (2013.01); F16K 31/0655 (2013.01); B29L 2031/7506 (2013.01)
USPC ...................................... 251/129.15; 335/262

(58) Field of Classification Search
USPC ....................................... 251/129.15; 335/262
See application file for complete search history.

(56) References Cited

U.S. PATENT DOCUMENTS

| | | | | |
|---|---|---|---|---|
| 3,593,241 A | * | 7/1971 | Ludwig | 335/262 |
| 5,402,093 A | * | 3/1995 | Gibas et al. | 335/261 |
| 5,544,857 A | * | 8/1996 | Torrence | 251/129.15 |
| 5,865,213 A | * | 2/1999 | Scheffel et al. | 137/614.16 |
| 6,144,275 A | * | 11/2000 | Hirata et al. | 335/262 |
| 6,219,903 B1 | * | 4/2001 | Osterhart et al. | 29/602.1 |
| 6,328,276 B1 | * | 12/2001 | Falch et al. | 251/54 |
| 7,275,732 B2 | * | 10/2007 | Kato et al. | 251/129.15 |
| 7,503,347 B2 | * | 3/2009 | Ryuen et al. | 137/625.65 |
| 8,061,685 B2 | * | 11/2011 | Ueda et al. | 251/129.15 |
| 8,104,739 B2 | * | 1/2012 | Vollmer et al. | 251/50 |

* cited by examiner

*Primary Examiner* — Matthew W Jellett
(74) *Attorney, Agent, or Firm* — Michael Best & Friedrich LLP (57) ABSTRACT A solenoid valve is proposed, having a substantially circular cross-sectional shape orthogonally in relation to an effective axis of the solenoid valve, it being possible for valve devices of the solenoid valve to be connected to one another by means of joining operations directed substantially in the direction of the effective axis, the valve devices having such peripheral shapes that the valve devices can be centered with respect to one another by means of the joining operations.

20 Claims, 7 Drawing Sheets

SOLENOID VALVE

BACKGROUND OF THE INVENTION

Conventional structural designs of solenoid valves have several disadvantages from a production engineering viewpoint. In particular, the structural designs comprise a great number of individual parts/assemblies, for which great assembly lines with circulating work carriers are required for assembly or production. This generally requires the following operations: loading the work carriers with the various individual parts and subassemblies, adjusting and laser welding components of the magnetic circuit, and screwing, riveting, flanging the magnetic circuit with the valve housing.

One disadvantage of the described production of the conventionally designed solenoid valves is particularly that of the large and technically complex assembly lines required for this. Adjustments and laser weldings of the components of the magnetic circuit are technically complex and resource-intensive. The individual assembly steps each need a screwing, riveting, bending, flanging and welding device of their own, whereby the numerous assembly steps have the cumulative effect of causing many tolerances, which may lead to a significant overall tolerance, and consequently inaccuracy of the solenoid valve.

SUMMARY OF THE INVENTION

It is therefore the object of the present invention to provide a solenoid valve that is simpler to produce.

The object is achieved by a solenoid valve with a substantially circular cross-sectional shape orthogonally in relation to an effective axis of the solenoid valve, it being possible for valve devices of the solenoid valve to be connected to one another by means of joining operations directed substantially in the direction of the effective axis, the valve devices having such peripheral shapes that the valve devices can be centered with respect to one another by means of the joining operations.

One advantage of the solenoid valve according to the invention is that the solenoid valve can be assembled from valve devices by means of simple axial joining operations, the valve devices being automatically centered and positioned with respect to one another during the joining operations on account of their specific shapings. This advantageously results in little assembly effort, which saves time and may have as a consequence significant cost reductions in comparison with conventional solenoid valves.

A preferred embodiment of the solenoid valve according to the invention provides that a first valve device is formed as a lifting magnet, the lifting magnet having a lifting rod as a centering means for centering elements that can be arranged in series on the lifting rod. With the aid of the centering means in the form of the lifting rod, onto which the elements of the lifting magnet can as it were be threaded, a first valve device in the form of the lifting magnet can be preassembled simply and exactly.

A further preferred embodiment of the solenoid valve according to the invention provides that the lifting magnet has a fixing element for the mechanical fixing of the elements arranged in series on the lifting rod. In this way, a simple fixing element is used for the mechanical fixing of the elements arranged in series on the lifting rod, which facilitates and speeds up an assembly operation of the lifting magnet subassembly.

A preferred embodiment of the solenoid valve according to the invention provides that a second valve device is formed as a housing for the first valve device, the second valve device having centering means for a magnet coil. By means of the centering means for the magnet coil, it is consequently advantageously possible in a simple way to carry out a positioning and centering of the magnet coil within the second valve device.

A preferred embodiment of the solenoid valve according to the invention provides that the centering means is formed in a tubular manner integrally with the second valve device. An advantageous consequence of this specific configuration of the centering means in the second valve device is that the joining together of the first valve device with the second valve device is simplified insofar as an automatic centering of the first valve device is carried out by said centering means during the joining operation of the first valve device with the second valve device.

An advantageous development of the solenoid valve according to the invention provides that the second valve device has a positioning means for a connector device, by means of which the magnet coil can be supplied with energy. The positioning means for the connector device consequently allows an assembly step of assembling the connector in the second valve device to be carried out in a simplified and speeded-up way, since the positioning means acts as a kind of coding for correct insertion of the magnet coil with the connector into the second valve device.

An advantageous development of the solenoid valve according to the invention provides that the second valve device has a positioning means for positioning the first valve device in the second valve device. By means of said positioning means of the second valve device, it is advantageously possible to carry out a joining together of the first valve device with the second valve device exactly and without any additional positioning effort.

An advantageous development of the solenoid valve according to the invention provides that the first valve device has a lifting rod that can be produced by means of a multi-component injection-molding process. This choice of material for the lifting rod helps to make it possible to advantageously dispense with laser welding processes between the lifting rod and further elements of the lifting magnet.

It is advantageously provided that the lifting rod has a sealing element on a sealing portion. This is an advantageous consequence of the material of the lifting rod. This makes it possible in a simple way to design the lifting rod in such a way that it has said sealing element on a sealing portion.

A preferred embodiment of the solenoid valve according to the invention provides that a third valve device is formed as a valve housing, to which the second valve device, joined together with the first valve device, can be fastened, the third valve device having positioning means for the second valve device. By means of the positioning means for the second valve device, a joining together of the preassembled second valve device with the third valve device can be advantageously carried out in a simple way with very little centering effort.

An advantageous development of the solenoid valve according to the invention provides that the positioning means is formed as clearances in the third valve device for retaining elements of the second valve device. This provides a simple-to-produce positioning means that is conducive to a simple connecting operation between the second valve device and the third valve device and a stable connection of the second valve device to the third valve device.

An advantageous development of the solenoid valve according to the invention provides that the retaining elements are formed in such a way that, after a joining together of the second valve device with the third valve device, they receive a force, acting along the effective axis, between the first valve device and the second valve device. In this way, an axial force produced as a result of the joining together of the second valve device with the third valve device is maintained along the effective axis of the solenoid valve after the fastening of the second valve device to the third valve device. This is conducive to an imperviousness, and consequently trouble-free operation, of the solenoid valve.

A preferred embodiment of the solenoid valve according to the invention provides that the third valve device has a locking device, by means of which the second valve device can be made to engage with the third valve device after the joining together with the third valve device and a turning operation in relation to the third valve device. An easily obtained self-locking connection between the second valve device and the third valve device, which can only be disconnected when it is actually intended, is obtained as an advantage of the locking mechanism provided as a result.

The invention is described in detail below with further features and advantages on the basis of several figures. All the features described or presented thereby form the subject matter of the invention on their own or in any desired combination, independently of how they are put together in the patent claims or how the claims relate to preceding claims, and independently of how they are worded or presented in the description or in the drawings. Already known principles of solenoid valves are not discussed in any more detail.

DETAILED DESCRIPTION

Figure 1:
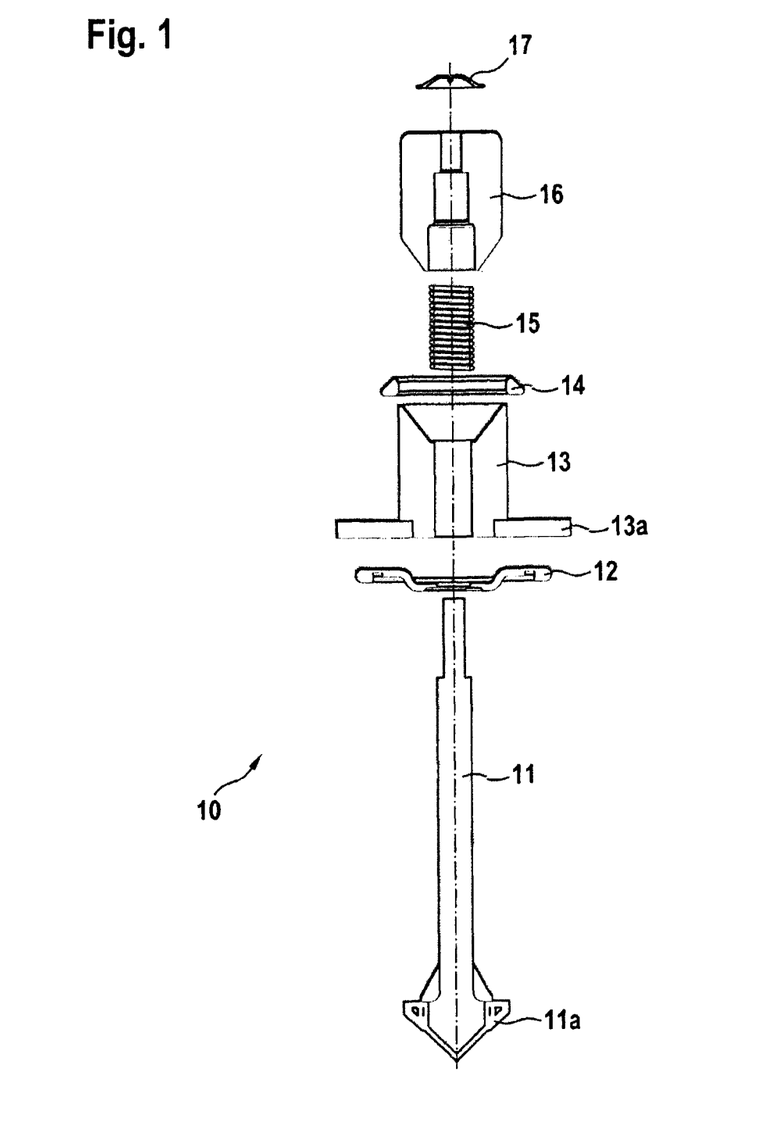
FIG. 1 shows a view of a detail of a first valve device of an embodiment of the solenoid valve according to the invention.

FIG. 1 shows a first valve device 10 of an embodiment of the solenoid valve according to the invention in an exploded view. The first valve device 10 has a lifting rod 11, which preferably comprises a material that is produced by means of a multi-component injection-molding process. The multi-component injection-molding process is preferably a two-component injection-molding technique, which allows the lifting rod 11 to be produced in a simple way and a sealing element 11a to be molded onto a sealing end of the lifting rod 11 in a single production step. Individual elements of the first valve device 10, which in the assembled-together state embody a lifting magnet, are fitted or threaded one after the other onto the lifting rod 11.

The individual elements comprise a seal 12, which is preferably formed as a sealing ring with a dirt wiper. A circular connection plate 13a with a guiding bush 13 pressed into the connection plate 13a is also fitted onto the lifting rod 11. After that, a first O-ring 14, which is used for sealing purposes within the first valve device 10, is pushed onto the lifting rod 11. Then, a spring 15, which serves for unlocking the solenoid valve in the deenergized state, is arranged in series on the lifting rod 11. The lifting rod 11 is finally inserted through a magnet armature 16 similar to a circular cylinder and is mechanically fixed by means of a clamping disk 17 with blocking elements (not represented) that is preferably produced from bronze or steel, resulting in a complete subassembly in the form of a lifting magnet with substantially circular peripheral shapes, a circle centerpoint corresponding to an effective axis of the solenoid valve.

It is therefore evident that the lifting rod 11 serves as a centering element similar to a circular cylinder, which receives the elements 12, 13, 13a, 14, 15, 16 and is intended for centering and fixing said elements on the lifting rod 11. This results in a simple and exactly aligned assembly of said elements on the lifting rod 11.

Figure 2:
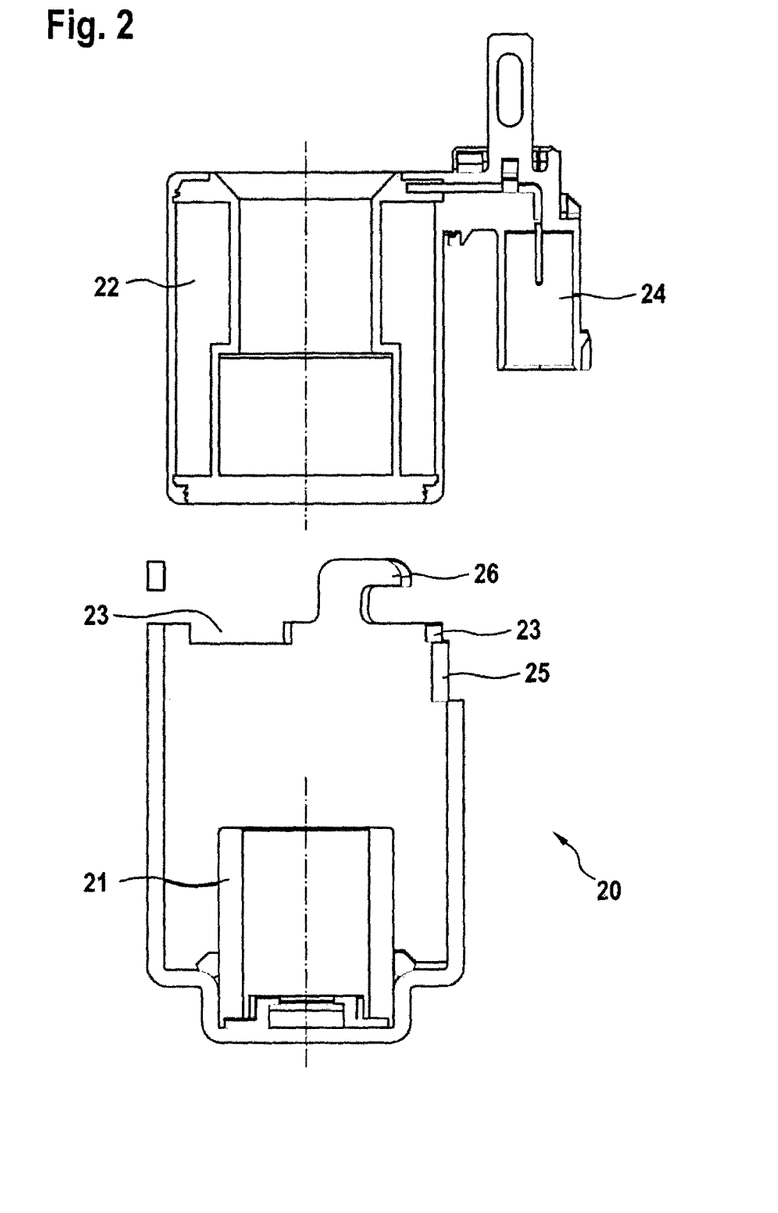
FIG. 2 shows a view of a detail of a second valve device of an embodiment of the solenoid valve according to the invention.

FIG. 2 shows in elevation a sectional view of a second valve device 20, which in the assembled-together state serves as a housing for the lifting magnet of the first valve device 10. The second valve device 20 is formed like a circular cylinder that is open on one side, a centering device in the form of a magnetic return ring 21 being provided at a closed end. The return ring 21, as part of a ferromagnetic circuit of the solenoid valve, is intended also to serve as a guiding and centering element for the lifting magnet. For this purpose, the return ring 21 is formed as a tubular piece integrally with the second valve device 20. At an upper, open portion of the second valve device 20, the second valve device 20 has three first clearances 23, intended as coding elements for the insertion of the connection plate 13a of the lifting magnet.

The second valve device 20 also has at the upper open end a second clearance 25, which is intended as an assembly location and a coding element for a connector 24, which supplies energy to a fully encapsulated magnet coil 22. This helps in a simple way to allow the connector 24 to be inserted into the second valve device 20 only at a position intended for it. Alternatively, the second clearance 25 may be arranged at a position (not represented) in the second valve device 20 that is offset by 120°, so that an alternative positioning of the connector 24 is possible. Misplacements of the connector 24 are in this way advantageously ruled out. The second valve device 20 also has at its upper, open end retaining elements 26, which are used for a positioning and fastening of the second valve device 20 in a third valve device 30 (not shown in FIG. 2). The retaining elements 26 are in this case preferably formed as undercuts of the second valve device 20. It is evident from FIG. 2 that the solenoid valve 22 with the connector 24 can be pushed in the axial direction of the solenoid valve into the second valve device 20 axially from above.

Figure 3:
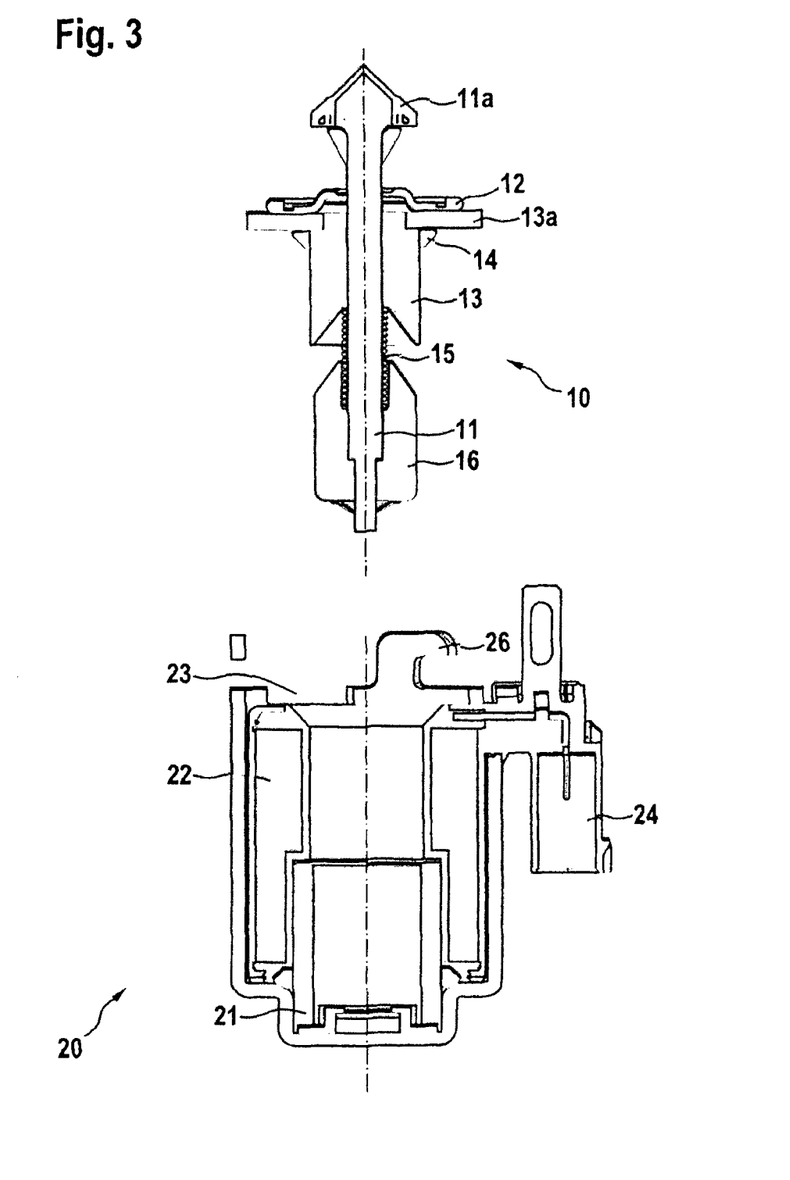
FIG. 3 shows a view of a detail of the preassembled first and second valve devices.

FIG. 3 shows the two preassembled valve devices 10, 20 in a cross-sectional view in elevation. The individual elements of the valve devices 10, 20 have already been explained in more detail with reference to FIGS. 1 and 2 and are therefore not explained again here. It is evident that then, in a next production step, the first valve device 10 is pushed into the second valve device 20 from above along an effective axis of the solenoid valve by means of an axial joining operation. The circular inner circumference of the second valve device 20 thereby acts as a guide for an outer rim of the circular connection plate 13 of the first valve device 10. The first clearances 23 at the upper open end of the second valve device 20 are intended for interacting with radially formed portions of the circular connection plate 13a in such a way that said portions engage in the first clearances 23 and in this way accomplish efficient antitwist protection between the first valve device 10 and the second valve device 20.

It is evident that the return ring 21 of the second valve device 20 serves as a guiding and centering element for the magnet armature 16 of the first valve device 10. The first valve device 10 is in this way centered and positioned at an end opposite from the sealing portion by means of the magnet armature 16 and the return ring 21 adapted to the magnet armature 16.

Furthermore, an axial fine centering or fine positioning of the magnet coil 22 within the second valve device 20 is achieved by means of the guiding bush 13 of the first valve device 10. It is therefore evident that an automatic positioning or centering of the first valve device 10 within the second valve device 20 is facilitated particularly also because of the radial peripheral shapes of elements of the first and second valve devices 10, 20.

Figure 4:
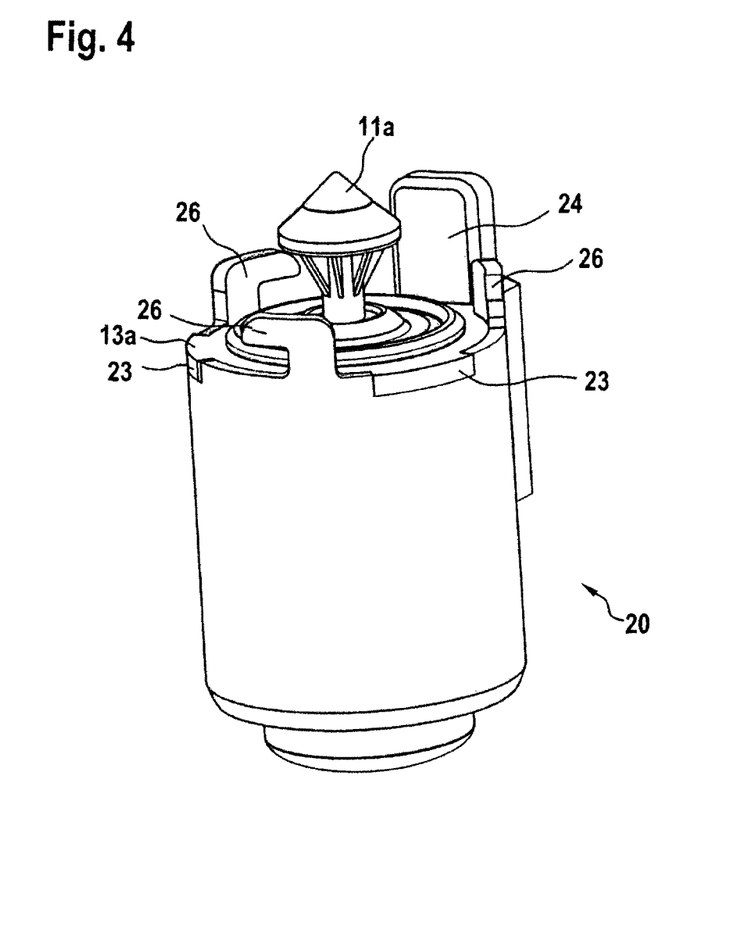
FIG. 4 shows a perspective view of the joined-together first and second valve devices.

FIG. 4 shows in a perspective representation an assembled-together second valve device 20, into which the first valve device 10 has been inserted. It is evident that three portions of the connection plate 13a that are offset substantially by 120° have engaged in the first clearances 23 of the second valve device 20. In this way, a stable connection between the first valve device 10 and the second valve device 20 is provided, which is conducive to a good mechanical stability of the second valve device 20 and an exact positioning and centering of the first valve device 10 within the second valve device 20. Also evident from FIG. 4 are the three retaining elements 26, which are used for a positioning and fastening of the second valve device 20 in the third valve device 30 (not represented in FIG. 4). The retaining elements 26 are in this case formed as hook-like undercuts of the second valve device 20 that are substantially offset by 120°.

Figure 5:
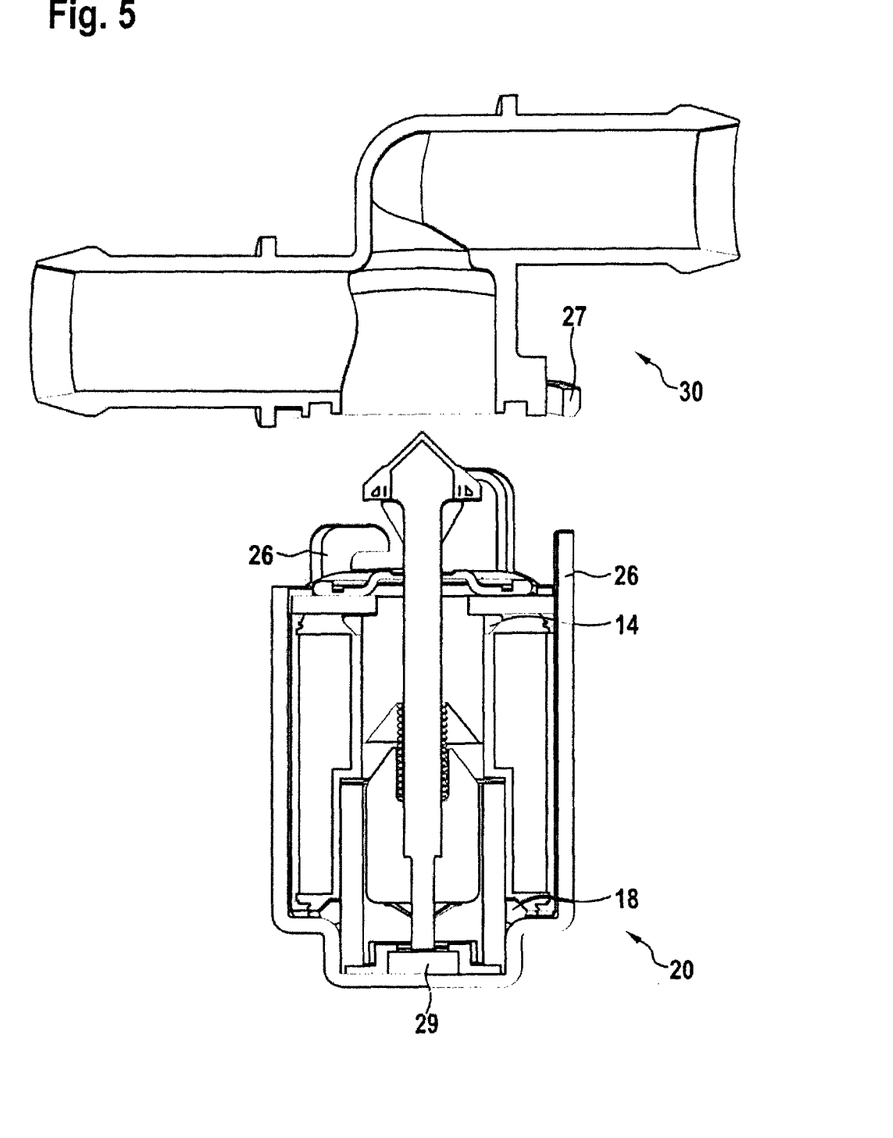
FIG. 5 shows a sectional view of the second and third valve devices before a joining together operation.

FIG. 5 shows in a sectional view in elevation the third valve device 30 together with the preassembled second valve device 20 before an assembly operation. The third valve device 30 is preferably formed as a valve housing for the solenoid valve according to the invention, which has an inflow and an outflow for a fluid to be transported by the solenoid valve. In an effective axis of the solenoid valve that is oriented in the direction of the lifting rod 11, the preassembled second valve device 20 with the inserted lifting magnet is joined together from below with the third valve device 30 by means of an axial joining operation. For this purpose, three third clearances 27 are provided in the third valve device 30 and are formed as elongate openings that are offset substantially by 120° and are adapted to the circular mounting opening of the third valve device 30. The third clearances 27 are in this case provided as through-openings for the three retaining elements 26 of the second valve device 20.

During the joining together of the third valve device 30 with the second valve device 20, within the second valve device 20 there builds up an axial force which tries to push the third valve device 30 away from the second valve device 20, and which results from the sealing elements in the form of the first O-ring 14 and the second O-ring 18 being pressed together. The retaining elements 26 preferably are formed in terms of length in such a way that they maintain the stated axial tensile stress within the second valve device 20 and maintain a substantially flush connection between the third valve device 30 and the second valve device 20. For this purpose, the lengths of the retaining elements 26 should be made correspondingly long, in order to satisfy the stated requirement in a static respect.

Figure 6:
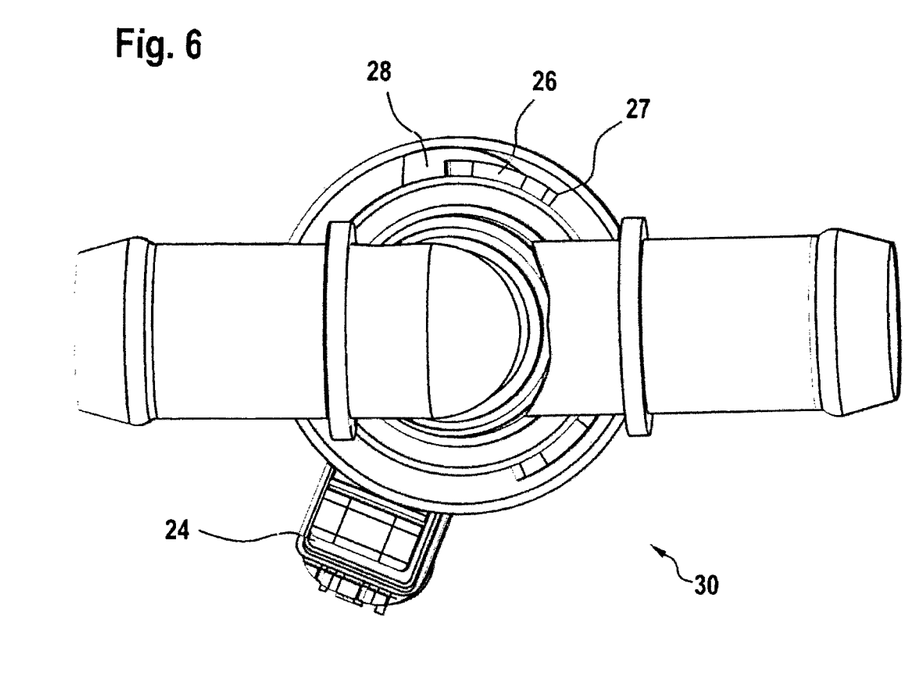
FIG. 6 shows a plan view of the third valve device with the second valve device inserted.

FIG. 6 shows in a plan view a third valve device 30 assembled together with the second valve device 20. After the axial connecting of the second valve device 20 to the third valve device 30, the second valve device 20 is turned by a few angular degrees (preferably by approximately 5° to approximately 10°) with respect to the third valve device 30. As a result, the retaining elements 26 are turned in the third clearances 27 of the third valve device 30, the third valve device 30 being provided with a locking mechanism 28 which, after said turning of the retaining elements 26 in the third clearances 27, engages behind the retaining elements 26 in its initial position. In this way, a self-locking, engageable connection between the third valve device 30 and the second valve device 20 is provided.

Figure 7:
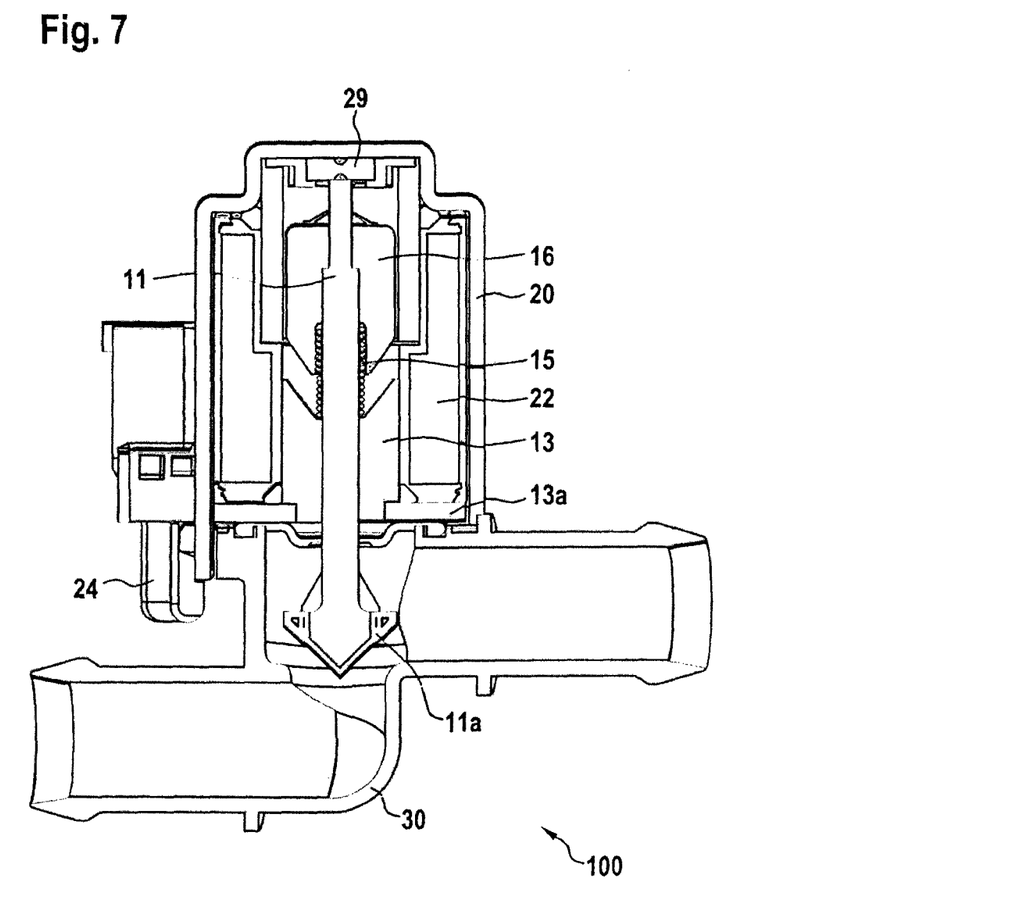
FIG. 7 shows a sectional view of the complete solenoid valve according to the invention.

The stated turning between the second valve device 20 and the third valve device 30 represents a final step of an assembly or production process of the solenoid valve 100, which is represented in cross section in an elevation in FIG. 7. FIG. 7 shows the solenoid valve 100 in the opened state, which is achieved by the magnet coil 22 not being supplied with current by way of the connector 24, whereby no mechanical axial force is exerted on the lifting rod 11 of the first valve device 10 by way of the magnet armature 16 and the guiding bush 13. Also evident in FIG. 7 is a damping element 29, which serves the purpose that, after an opening of the solenoid valve 100, the lifting rod 11 is damped when it strikes a metal housing of the second valve device 20.

To sum up, a solenoid valve which can be preassembled and finally assembled in a simple way is proposed, individual valve devices being able to be connected to one another in a final assembly process by means of axial joining operations. Shapings of the valve devices that are adapted to one another and positioning or centering elements arranged in the valve devices serve the purpose of allowing the valve devices to be positioned or centered exactly in relation to one another on the basis of the joining operations. The ease with which they can be centered is attributable not least to the fact that the valve devices have substantially circular peripheral shapes that are adapted to one another, a common circle centerpoint corresponding to the effective axis of the solenoid valve.

This advantageously dispenses with the need for any additional centering and/or adjusting effort with corresponding auxiliary processes, which can significantly speed up a production process of the solenoid valve according to the invention and thereby considerably reduce the costs. Particularly advantageously, the complete production process of the solenoid valve can be carried out at a single assembly site. There is advantageously no need for complex laser-welded, flanged, riveted or screwed connections of individual valve groups, advantageously resulting in a favorable overall tolerance as the cumulative effect of few tolerances. As a result, a solenoid valve that can be efficiently produced with few resources, and therefore economically, is provided by the invention.

It is self-evident to a person skilled in the art that the described features of the invention can be suitably modified and combined with one another without departing from the essence of the invention.

What is claimed is:

1. A solenoid valve (100) with a substantially circular cross-sectional shape orthogonally in relation to an effective axis of the solenoid valve (100), the solenoid valve (100) including a first, a second, and a third valve device (10, 20, 30) connected to one another by threadless joining operations directed substantially in the direction of the effective axis, the valve devices (10, 20, 30) having peripheral shapes such that the valve devices (10, 20, 30) can be centered with respect to one another by the threadless joining operations, wherein the first valve device (10) includes a lifting magnet, the second valve device (20) includes a housing for the first valve device (10), and the third valve device (30) includes a valve housing to which the second valve device (20), joined together with the first valve device (10), is coupled, wherein the second valve device (20) includes a first closed end and a second open end spaced along the effective axis from the first closed end, a portion of the first valve device (10) protruding out of the second open end, wherein the second valve device (20) is coupled to the third valve device (30) at the second open end, and wherein the third valve device (30) includes a fluid inlet and a fluid outlet.

2. The solenoid valve according to claim 1, wherein the first valve device (10) includes a lifting rod (11) operable to center elements (12, 13, 14, 15, 16) arranged in series on the lifting rod (11).

3. The solenoid valve according to claim 2, wherein the lifting magnet has a fixing element (17) for the mechanical fixing of the elements (12, 13, 14, 15, 16) arranged in series on the lifting rod (11).

4. The solenoid valve according to claim 2, wherein the lifting rod (11) is produced by a multi-component injection-molding process.

5. The solenoid valve according to claim 4, wherein the lifting rod (11) has a sealing element (11a) on a sealing portion.

6. The solenoid valve according to claim 2, wherein the second valve device (20) includes a centering means (21) for a magnet coil (22).

7. The solenoid valve according to claim 6, wherein the centering means (21) is formed in a tubular manner integrally with the second valve device (20).

8. The solenoid valve according to claim 6, wherein the second valve device (20) has a first positioning means (23) for a connector device (24), through which the magnet coil (22) can be supplied with energy.

9. The solenoid valve according to claim 8, wherein the second valve device (20) has a second positioning means (25) for positioning the first valve device (10) in the second valve device (20).

10. The solenoid valve according to claim 4, wherein the third valve device (30) includes a third positioning means (27) for the second valve device (20).

11. The solenoid valve according to claim 10, wherein the third positioning means is formed as clearances in the third valve device (30) for retaining elements (26) of the second valve device (20).

12. The solenoid valve according to claim 11, wherein the retaining elements (26) are formed in such a way that, after a joining together of the second valve device (20) with the third valve device (30), the retaining elements (26) receive a force, acting along the effective axis, between the first valve device (10) and the second valve device (20).

13. The solenoid valve according to claim 12, wherein the third valve device (30) has a locking device (28), by which the second valve device (20) can be made to engage with the third valve device (30) after the joining together with the third valve device (30) and a turning operation in relation to the third valve device (30).

14. The solenoid valve according to claim 1, wherein the joining operations are weldless.

15. A solenoid valve (100) with a substantially circular cross-sectional shape orthogonally in relation to an effective axis of the solenoid valve (100), the solenoid valve (100) including a first, a second, and a third valve device (10, 20, 30) connected to one another by weldless joining operations directed substantially in the direction of the effective axis, the valve devices (10, 20, 30) having peripheral shapes such that the valve devices (10, 20, 30) can be centered with respect to one another by the weldless joining operations, wherein the first valve device (10) includes a lifting magnet, the second valve device (20) includes a housing for the first valve device (10), and the third valve device (30) includes a valve housing to which the second valve device (20), joined together with the first valve device (10), is coupled, wherein the second valve device (20) includes a first closed end and a second open end spaced along the effective axis from the first closed end, a portion of the first valve device (10) protruding out of the second open end, wherein the second valve device (20) is coupled to the third valve device (30) at the second open end, and wherein the third valve device (30) includes a fluid inlet and a fluid outlet.

16. The solenoid valve according to claim 15, wherein the first valve device (10) includes a lifting rod (11) operable to center elements (12, 13, 14, 15, 16) arranged in series on the lifting rod (11).

17. The solenoid valve according to claim 16, wherein the lifting magnet has a fixing element (17) for the mechanical fixing of the elements (12, 13, 14, 15, 16) arranged in series on the lifting rod (11).

18. The solenoid valve according to claim 16, wherein the lifting rod (11) is produced by a multi-component injection-molding process.

19. The solenoid valve according to claim 18, wherein the lifting rod (11) has a sealing element (11a) on a sealing portion.

20. The solenoid valve according to claim 16, wherein the second valve device (20) includes a centering means (21) for a magnet coil (22).

* * * * *